United States Patent
Kang et al.

(10) Patent No.: US 9,892,217 B2
(45) Date of Patent: Feb. 13, 2018

(54) BRAKE HILS SYSTEM FOR A RAILWAY VEHICLE

(71) Applicant: Konkuk University Industrial Cooperation Corp, Seoul (KR)

(72) Inventors: Chul-Goo Kang, Seoul (KR); Nam Jin Lee, Anyang-si (KR); Dong-Chan Lee, Seongnam-si (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 389 days.

(21) Appl. No.: 14/684,454

(22) Filed: Apr. 13, 2015

(65) Prior Publication Data
US 2015/0294049 A1    Oct. 15, 2015

(30) Foreign Application Priority Data
Apr. 14, 2014 (KR) .......................... 10-2014-0044286

(51) Int. Cl.
| | | |
|---|---|---|
| *G06G 7/48* | (2006.01) | |
| *G06F 17/50* | (2006.01) | |
| *B60T 17/22* | (2006.01) | |
| *B60T 13/66* | (2006.01) | |

(52) U.S. Cl.
CPC ........ *G06F 17/5009* (2013.01); *B60T 13/665* (2013.01); *B60T 17/228* (2013.01); *G06F 17/5095* (2013.01); *G06F 2217/86* (2013.01)

(58) Field of Classification Search
CPC .... G01R 31/008; G01R 31/007; A62C 27/00; B60T 13/665; B60T 13/266; B60T 8/17551; B60T 17/228; B60T 8/17633; B61H 5/00; B61K 9/08
See application file for complete search history.

(56) References Cited

U.S. PATENT DOCUMENTS 3,985,396 A * 10/1976 Kuwana .............. B60T 8/17633
                                                                    303/163
4,361,870 A * 11/1982 D'Agostini .......... G01R 31/007
                                                                    701/29.6
(Continued)

FOREIGN PATENT DOCUMENTS

| KR | 10-0668911 B1 | 1/2007 | | |
|---|---|---|---|---|
| WO | WO 2013/144543 A2 * | 10/2013 | .............. | B60T 13/26 |
| WO | WO 2013/156062 A1 * | 10/2013 | .............. | B60R 31/00 |

OTHER PUBLICATIONS

Li et al., CN 201364241 (Y) published on Dec. 16, 2009.*

*Primary Examiner* — Kandasamy Thangavelu
(74) *Attorney, Agent, or Firm* — Revolution IP, PLLC (57) ABSTRACT

Disclosed is a brake HILS system for a railway vehicle, comprising: a user terminal that receives values relating to braking conditions of a railway vehicle through a user interface and monitors simulation results; a pneumatic brake that includes an electronic control unit, a brake operation unit, a wheelset, a brake caliper, and a wheel slide protection valve and produces pneumatic pressure and transmits a braking force to the wheelset in accordance with the braking conditions from the user terminal; a load cell that is disposed on a wheel or a disc and measures a braking force from the pneumatic pressure; and a modeling unit that simulates the running and braking dynamic characteristics of a railway vehicle in real-time using mathematical models.

4 Claims, 5 Drawing Sheets

(56) References Cited

U.S. PATENT DOCUMENTS

| | | | | |
|---|---|---|---|---|
| 5,104,203 | A * | 4/1992 | Ferri | B60T 13/665 |
| | | | | 303/128 |
| 6,192,736 | B1 * | 2/2001 | Clem | B61K 9/08 |
| | | | | 73/10 |
| 7,315,804 | B2 * | 1/2008 | Sato | B60T 8/17551 |
| | | | | 700/286 |
| 9,283,945 | B1 * | 3/2016 | Kernwein | B60T 17/228 |
| 2003/0158638 | A1 * | 8/2003 | Yakes | A62C 27/00 |
| | | | | 701/22 |
| 2003/0227010 | A1 * | 12/2003 | Petrak | B60T 11/046 |
| | | | | 254/294 |
| 2014/0097049 | A1 * | 4/2014 | Kato | B61H 5/00 |
| | | | | 188/73.1 |
| 2015/0276555 | A1 * | 10/2015 | Bourgoin | G01R 31/008 |
| | | | | 702/122 |
| 2015/0307071 | A1 * | 10/2015 | Bradley | B60T 13/266 |
| | | | | 303/20 |

* cited by examiner

BRAKE HILS SYSTEM FOR A RAILWAY VEHICLE

CROSS-REFERENCE TO RELATED APPLICATIONS

This application claims the priority of Korean Patent Application No. 10-2014-0044286 filed on Apr. 14, 2014, in the Korean Intellectual Property Office, the disclosure of which is incorporated herein by reference.

BACKGROUND OF THE INVENTION

Field of the Invention

The present invention relates to a brake HILS (hardware-in-the-loop simulation) system for a railway vehicle, and more particularly, to a brake HILS system for a railway vehicle which simulates a brake system of a railway vehicle including a pneumatic brake system implemented with actual hardwares, in combination with a dynamic characteristic model of the vehicle.

Description of the Related Art

Railroad transportation has been considered as 21th century overland transport for mass transport, high speed, and exactness, and as the railroad transportation becomes faster, a brake system for securing safety and reliability has been considered as an important factor.

A brake system for a railway vehicle, which can stop a railway vehicle running at a high speed with large inertia and mass at an exact position and at an exact time, is an important part directly related to the safety of the railway vehicle. Railway vehicles are equipped with various types of brake systems and appropriately combine (that is, blend) and use them in accordance with the speed and braking situations. In braking types of railway vehicles, there are largely electric braking and mechanical braking. In general, in order to brake a railway vehicle, electric braking is generally used at high speeds and mechanical braking is used at low speeds, thereby completely stopping a railway vehicle.

In the mechanical braking, pneumatic braking is commonly used at present. The pneumatic braking is a type that converts an electrical signal according to a braking command into a pneumatic signal, supplies pneumatic pressure to a brake cylinder, presses a wheel or a disc through a caliper using a force generated in response to the signal, and uses a friction force due to the pressing. In detail, an ECU (Electronic Control Unit) calculates a necessary braking force from a braking command signal, a pneumatic signal, and a speed signal, and obtains necessary pneumatic pressure by communicating with a TCU (Traction Control Unit). A current value corresponding to the necessary pneumatic pressure is outputted and transmitted from an ECU to an EP valve (electro-pneumatic valve), the necessary pneumatic pressure is produced, and the pneumatic pressure is transmitted to a brake cylinder through a WSP (wheel slide protection) valve, thereby generating a braking force.

In the pneumatic braking, there are tread braking, disc braking, and wheel disc braking. The tread braking, a way of converting kinetic energy into thermal energy and dispersing it to the air by pressing a brake shoe to the tread of a wheel, has a defect of a large amount of wheel wear. The disc braking, a way of obtaining a braking force by pressing brake pads to both sides of a disc fitted on an axle, needs more parts, but dissipates heat well without wearing a wheel. However, a motor bogie requires a mechanism for transmitting power from a motor to a wheelset, so there is no sufficient space for installing a disc in a motor bogie and accordingly it is difficult to install a disc in a motor bogie. The wheel disc braking is a way of pressing disc materials on both sides of a wheel with brake pads, thereby braking. In general, the wheel disc braking is used for motor bogies and the disc braking is used for trailer bogies.

In the electric braking, there are rheostatic braking, regenerative braking, and eddy current rail braking. The rheostatic braking is a way of using power generation load as a braking force by operating a traction motor temporarily as an AC or a DC power generator, and of discharging the power as heat by sending it to a main resistor. The regenerative braking is a way of using power generation load as a braking force by operating a traction motor as a power generator and of sending back the power to a power supply to reuse it. The regenerative braking is excellent in terms of energy efficiency, so it is usually used for the subway requiring frequent acceleration and deceleration. The eddy current rail braking is a way of using a braking force that is generated by eddy current induced in a rail when a current is applied to an electromagnet above a rail. The eddy current rail braking does not use a mechanical friction force between a wheel and a rail, so it can obtain a braking force larger than an adhesive force, but is difficult to achieve technically.

There are various types of resistance when a train is running. Train resistance is a general term for them, which includes starting resistance, running resistance, grade resistance, and curve resistance. The starting resistance is generated when a train starts and depends on the state of lubrication, and it can be neglected because it rapidly decreases with an increase of vehicle speed. The running resistance includes resistance due to friction between mechanical parts such as bearings, resistance caused by friction between a rail and a tread and proportioned to a speed, and resistance caused by air friction and proportioned to the square of a speed.

Braking of a railway vehicle is achieved basically by an adhesive force between the wheels and rails, so there is a need of deep understanding for a contact model between a wheel and a rail. First, it is required to understand a creepage model of rolling contact, assuming that a rail and a wheel are not rigid bodies, but elastic bodies. Creepage, an index representing a relative sliding speed between a wheel and a rail, as in the following Equation 1, is a dimensionless number that is the ratio of the difference between a wheel speed and a vehicle body speed to a reference speed.

$$\text{Creepage } \xi = \frac{V_{rail} - V_{wheel}}{V} \qquad \text{[Equation 1]}$$

A creepage theory has been introduced by Carter in his paper in 1926, de Parter and Johnson generalized the result by Carter in three dimensions, and Kalker established a theory about a linear relationship between creepage and creep force. Polach established a theory about a non-linear relationship between creepage and creep force.

In the creepage theory, a wheel and a rail are considered as not rigid bodies, but elastic bodies, so a contact portion makes not a point, but an elliptical surface, and it is called a contact patch. When a braking force is applied, a part of the contact patch becomes a stick area and the other part of the contact patch becomes a slip area, so the total effect appears to be a sliding with a relative speed difference between a wheel and a rail. In other words, when a braking force is applied, a difference is generated between the linear speed of the center of a wheel and the circumferential speed of the wheel, so small creepage is generated. If the braking force increases further, entire contact surface slides, and then a coulomb friction force is generated between a wheel and a rail. The creepage theory allows analyzing microphenomenon at a contact patch between elastic bodies, which cannot be explained by Coulomb friction of rigid bodies.

The creepage can be classified into three types; longitudinal creepage, lateral creepage, and spin creepage. The longitudinal creepage, which is the creepage of a contact patch in the movement direction of a vehicle, represents a relative sliding speed in the movement direction of a vehicle and is caused by lateral displacement or a yaw angle change of a wheelset. The lateral creepage, which represents a relative lateral sliding speed of a contact patch, usually appears in running on a curved rail and is influenced by a contact angle with a rail surface. The spin creepage appears in running on a curved rail and represents a sliding angular speed in spinning. When running on a straight rail, the spin creepage is relatively small, as compared with the longitudinal creepage, so it can be neglected.

Braking phenomena including a contact model between a wheel and a rail, are very complicated, and so the performance of braking systems has been improved through both of theoretical analysis and actual tests on railway vehicles. However, braking tests using actual railway vehicles are very limited, and it is almost impossible to perform braking tests using actual railway vehicles for dangerous situations. However, using an HILS (hardware-in-the-loop simulation) system allows experimentations for braking tests under similar environments to actual vehicle tests, as well as experimentations for braking tests under dangerous situations in which actual vehicle tests are impossible.

The advantage of the HILS system is to make it possible to directly test the performance of prototype hardwares and controllers and software logics in a short time with a low cost. That is, it is possible to investigate and evaluate the performance of designed hardware products and software logics with an HILS system under environments similar to those for actual vehicle tests, by simulating expensive and dangerous vehicle running in real-time using a computer and by putting actual hardware products and software logics to be tested as parts of the HILS system. In view of the designed hardwares and logics, the operations and performances of the hardwares and logics can be tested under environments and conditions similar to those of actual vehicle tests.

Various attempts for implementing realistic vehicle simulations and for solving problems related to braking using the HILS system have been made.

The background of the present invention has been disclosed in Korean Patent No. 10-0668911 (Jan. 12, 2007).

SUMMARY OF THE INVENTION

An aspect of the present invention provides a brake HILS system for a railway vehicle which can replace actual vehicle tests by simulating a brake system of a railway vehicle, using an actual pneumatic brake system of a railway vehicle, in combination with dynamic computer models for running and braking characteristics of the vehicle.

According to an aspect of the present invention, there is provided a brake HILS system for a railway vehicle that includes: a user terminal that receives values relating to braking conditions of a railway vehicle through a user interface and monitors simulation results; a pneumatic brake that includes an electronic control unit (ECU), a brake operation unit (BOU), a wheelset, a brake caliper, and a wheel slide protection valve and produces pneumatic pressure and transmits a braking force to the wheelset in accordance with the braking conditions from the user terminal; a load cell that is disposed on a wheel or a disc and measures a braking force from the pneumatic pressure; and a modeling unit that simulates the running and braking dynamic characteristics of a railway vehicle in real-time using mathematical models.

The electronic control unit may calculate a braking force to be applied to the wheelset on the basis of an input braking condition and transmit the calculation result to the brake operation unit, the brake operation unit may produce pneumatic pressure corresponding to the calculation result and transmit the pneumatic pressure to the brake caliper on the wheelset, and the brake caliper may convert the pneumatic pressure to a braking force acting on the wheel.

The modeling unit may simulate in real-time a wheel slide protection function by producing different adhesive forces for wheelsets by changing a friction coefficient between a wheel and a rail in the vehicle-running simulation.

The modeling unit may feed back to the electronic control unit at least one signal among four wheelset speeds, an emergency braking command, a brake mode signal, payload, and a brake command, corresponding to the simulation result for braking of the railway vehicle.

The braking condition inputted to the user terminal may include at least one among a normal braking command, an emergency braking command, an emergency instruction, and payload.

The simulation result monitored through the user terminal may include at least one among a braking distance, a vehicle speed, a vehicle deceleration/acceleration, a rotational speed of the wheelset, and a braking force.

The modeling unit may include at least one parameter among a braking command, an emergency instruction, payload, a track inclination, a track friction coefficient, an adhesive coefficient, information about variable vehicle weight, and simulate in real-time the braking dynamic characteristics of various railway vehicles by changing the parameters of railway vehicles.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Hereinafter, exemplary embodiment of the present invention will be described in detail with reference to the accompanying drawings for those skilled in the art to be able to easily accomplish the present invention. However, the present invention may be achieved in various different ways and is not limited to the embodiments described herein. In the accompanying drawings, portions not related to the description will be omitted in order to clearly describe the present invention, and similar reference numerals will be used to describe similar components throughout the specification.

Figure 1:
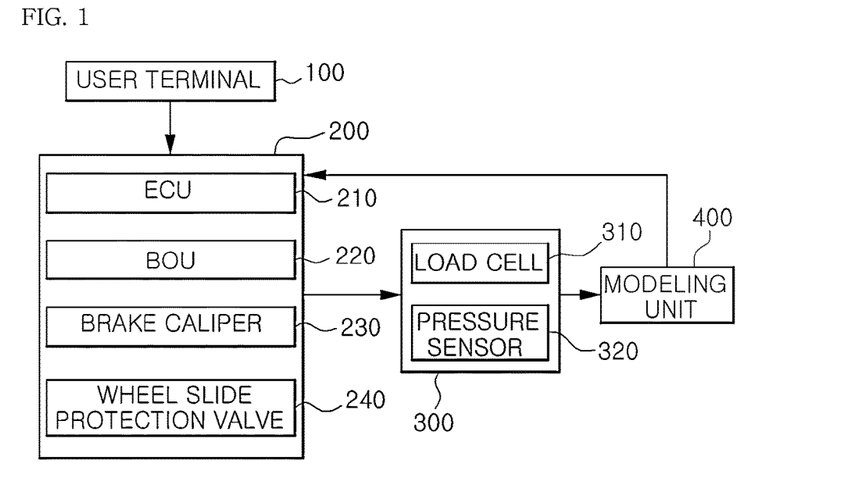
FIG. 1 is a diagram illustrating the configuration of a brake HILS system for a railway vehicle according to an embodiment of the present invention.

FIG. 1 is a diagram illustrating the configuration of a brake HILS system for a railway vehicle according to an embodiment of the present invention.

A brake HILS system for a railway vehicle illustrated in FIG. 1 includes a user terminal 100, a pneumatic brake 200, a sensor unit 300, and a modeling unit 400.

According to an embodiment of the present invention, by simulating a portion corresponding to a dynamic characteristic model of a vehicle in real-time, by implementing a pneumatic brake system including an ECU using actual hardwares, and by connecting all of parts relating to braking, the present invention provides a brake HILS system for a railway vehicle that can provide a similar test environment to an actual vehicle test.

The user terminal 100, which functions as a Host PC, outputs a brake command signal to the pneumatic brake 200 and monitors a simulation result from the modeling unit 400. The user terminal 100, an I/O device for operating the brake HILS system for a railway vehicle, may be a device that can connect with the pneumatic brake 200 and the modeling unit 400 through a wire or wirelessly and exchange information with them, such as not only a desk top, but a notebook, a workstation, a palmtop computer, a PDA (Personal Digital Assistant), a web pad, and a mobile communication terminal.

The pneumatic brake 200 includes an ECU (electronic control unit) 210, a BOU (brake operation unit) 220, a brake caliper 230, and wheel slide protection valves 240.

The pneumatic brake 200 may further include a brake pad, a wheel, an air compressor, wheel slide protection valves, and an ASCU (Anti-Skid control unit), and is a mechanical brake for generating a braking force by pneumatic pressure.

The sensor unit 300 includes load cells 310 and pressure sensors 320. The load cell 310 is disposed on a wheel or a disc, and particularly, it is disposed between a wheel disc and a brake pad in wheel disc braking and between a disc and a brake pad in disc braking, and measures force acting on the brake pad by brake caliper 230. Only one or many load cells 310 may be disposed on a wheel or a disc.

The pressure sensor 320 measures pneumatic pressures of the BOU 220, the brake caliper 230, and the wheel slide protection valve 240.

The modeling unit 400 keeps a mathematical model for a railway vehicle and implements vehicle dynamics by software program using a high-performance DSP (digital signal processing) device. The modeling unit 400 calculates a braking force from a measured force by the load cell 310, and simulates in real-time a braking logic and a braking dynamic characteristic by applying the braking force to the mathematical model of a railway vehicle.

Further, a track inclination, a track friction coefficient, an adhesive coefficient, information about variable vehicle weight (0 to 100%) that are parameters of a railway vehicle can be set in the modeling unit 400, and the modeling unit 400 simulates in real-time the braking dynamic characteristics of various railway vehicles by changing the parameters of railway vehicles. Further, the modeling unit 400 transmits the simulation result to the ECU 210 for feedback control.

Figure 2:
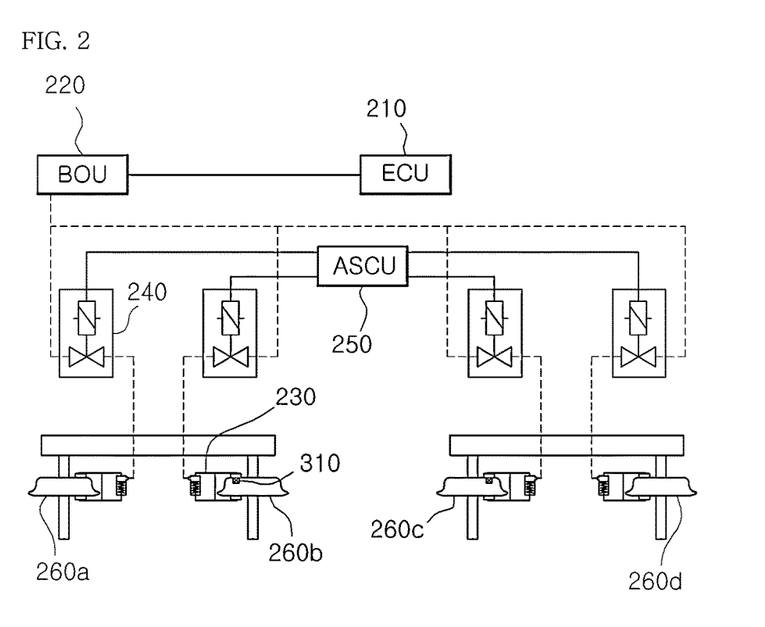
FIG. 2 is a diagram illustrating the configuration of a pneumatic brake according to an embodiment of the present invention.
Figure 3:
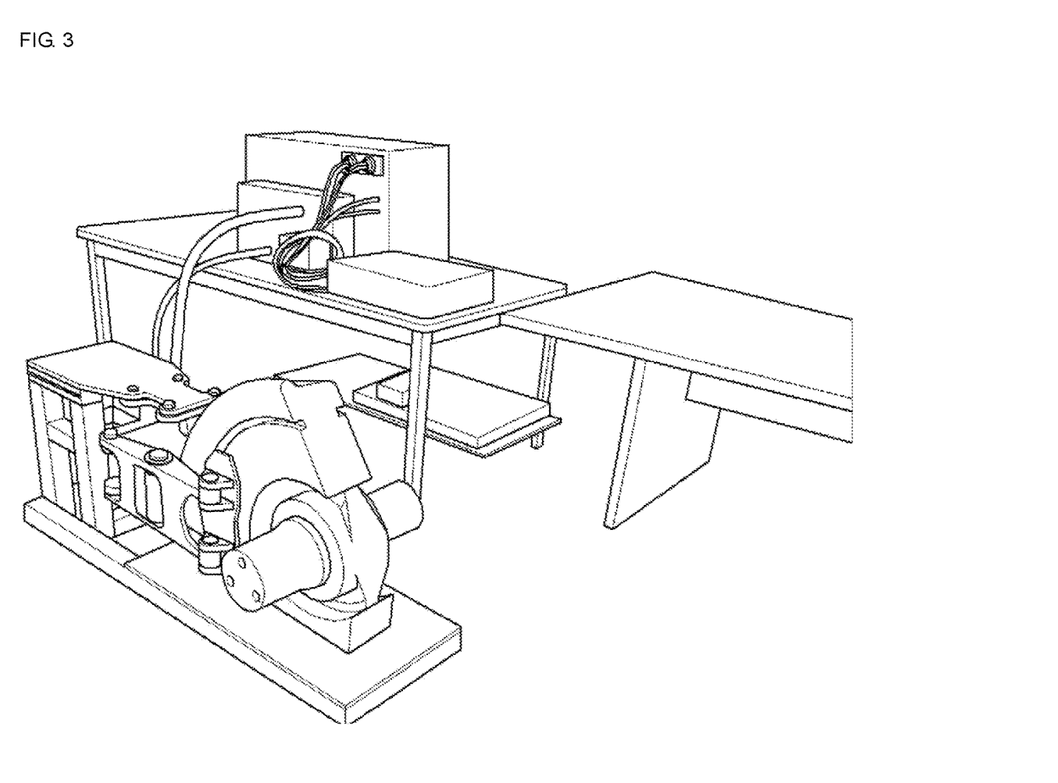
FIG. 3 is an exemplary picture illustrating a brake HILS system including an actual pneumatic brake.

FIG. 2 is a diagram illustrating the configuration of a pneumatic brake according to an embodiment of the present invention and FIG. 3 is an exemplary picture of a brake HILS system including an actual pneumatic brake.

As illustrated in FIG. 2, the ECU 210 transmits a control signal for braking to the BOU 220 through a signal conditioner (not illustrated). The BOU 220 is connected to wheel slide protection valves 240 corresponding to four wheelsets 260a, 260b, 260c, and 260d, respectively, and adjusts pneumatic pressure for braking.

The ASCU 250 is also connected to the wheel slide protection valves 240 corresponding to four wheelsets 260a, 260b, 260c, and 260d, respectively, and adjusts pneumatic pressure for preventing wheel slide.

Output ends of the wheel slide protection valves 240 are connected to the brake calipers 230 on wheels. The load cell 310 is disposed on at least one wheel or disc and measures the braking force of the brake calipers 230.

The pneumatic brake 200 illustrated in FIGS. 1 to 3 is described in detail hereafter.

In general, the ECU receives a brake command, weight, and a vehicle speed signal as input, secures compressed air through a relay valve via an EP (electro-pneumatic) valve converting a calculated electrical signal into pneumatic pressure, and sends the compressed air to a brake cylinder. The ECU 210 in a motor bogie performs blending control with electric braking. The ECU 210 is usually disposed inside the BOU 220 and performs digital calculation using a microprocessor. The ECU 210 receives a braking control signal from a driver through a train line wire.

The ECU 210 performs braking force blending, a braking pattern generation, a jerk control, inshot control, and pneumatic pressure control. Since it is difficult to measure a generated braking force, open loop control is usually applied to a braking force. An open loop braking control algorism is simple and easily achieved, but it is weak to disturbance of a system.

The ECU 210 calculates the weight load of a train from the pressure of an air spring and performs load compensating control to maintain a deceleration performance regulated for normal and emergency braking on the basis of the weight. The inshot control function produces pneumatic pressure considering an offset value due to spring reaction force inside the brake cylinder. The inshot control function allows fast braking response in pneumatic braking, and helps efficient brake blending between electric braking and mechanical braking.

The maximum braking force that can be produced by a brake for a railway vehicle usually depends on the adhesive force between the wheel and the rail. The adhesive force may be expressed by an adhesion coefficient between the wheel and the rail, and the adhesion coefficient is a function of a train speed and environmental factors such as rail conditions (dry condition, wet condition, dirt condition, and the like), a climate condition, and a geographical condition (a tunnel, altitude, and the like) and is obtained by repeated tests using a vehicle under various conditions. The adhesive force is assumed to be in proportion to the multiplication of an axle load and an adhesion coefficient. When a frictional braking force at the disc is over an adhesive force on the rail, a vehicle is in a slide (skid) state, and then problems will occur such as a wheel flat at contact patch and reduction of braking force, which results in a dangerous running situation of the railway vehicle.

When the adhesive force between wheels and rails decreases below the braking force at the disc and a wheel slide occurs, the ASCU (anti-skid control unit) 250 rapidly eliminates the wheel slide by controlling wheel slide protection (WSP) valves 240, achieves re-adhesion of the wheel, and thus protect the wheel flat and assures a running train safety.

The ASCU 250 reads signals from speed sensors on the four wheelsets 260a, 260b, 260c, and 260d, and determines a wheel slide, a re-adhesion and a complete re-adhesion on the basis of measured speed signals. In accordance with the states of the wheelset determined by the ASCU 250, the ASCU 250 transmits the output for quick release, hold, recovery, and normal application modes to the WSP valves 240.

The ASCU 250 releases the applied braking force, so abnormal operation of the ASCU 250 may be fatal to the safety of a railway vehicle. Accordingly, the safety of the railway vehicle is increased by managing a failure safety circuit, a detection level of abnormal wheel slide, and self-diagnosis in the ASCU 250.

The WSP valve 240 is an actuator of an anti-skid control system, and rapidly responds to several signals from the ASCU 250. In general, the WSP valve 240 is composed of two electronic valves, an output port, an input port, and a discharge port. The two electronic valves are an RV (release magnet valve) and an HV (hold magnet valve) and the WSP valve operates in quick release mode, hold mode, recovery mode, or normal application mode in accordance with states of the two electronic valves.

As an example of operation of the ASCU 250, it is assumed that one wheelset slides after a while from the point of time when a vehicle starts to be braked. When one wheelset slides and its speed becomes different from those of other wheelsets, a slide detection signal is set. When the slide detection signal is set, the ASCU 250 creates and transmits a recovery mode command to the WSP valve 240, and the WSP valve 240 attenuates wheel slide by reducing the brake cylinder (BC) pressure. When a speed reduction rate of a wheelset decreases, a re-adhesion signal is generated, the BC pressure is gradually recovered, and full adhesion is made eventually.

A virtual nominal speed $V_{nominal}$ of an axle is calculated from the actual speeds of four wheelsets and a speed decreased by the predetermined maximum deceleration of the wheelsets. When the nominal speed $V_{nominal}$ is determined, an anti-skid control logic is executed for the wheelsets by comparing the nominal speed with the actual speeds of the four wheelsets.

Each car of a railway vehicle is basically composed of a car body, two bogies, and four wheelsets, and for connecting them, a primary suspension unit, a secondary suspension unit, anti-roll bars, yaw dampers, a traction link, and lateral dampers are provided. Dynamic characteristics of those components are modeled each by three degrees of freedom or six degrees of freedom in braking, and the dynamic behavior of the vehicle is evaluated by solving these differential equations numerically.

Figure 4:
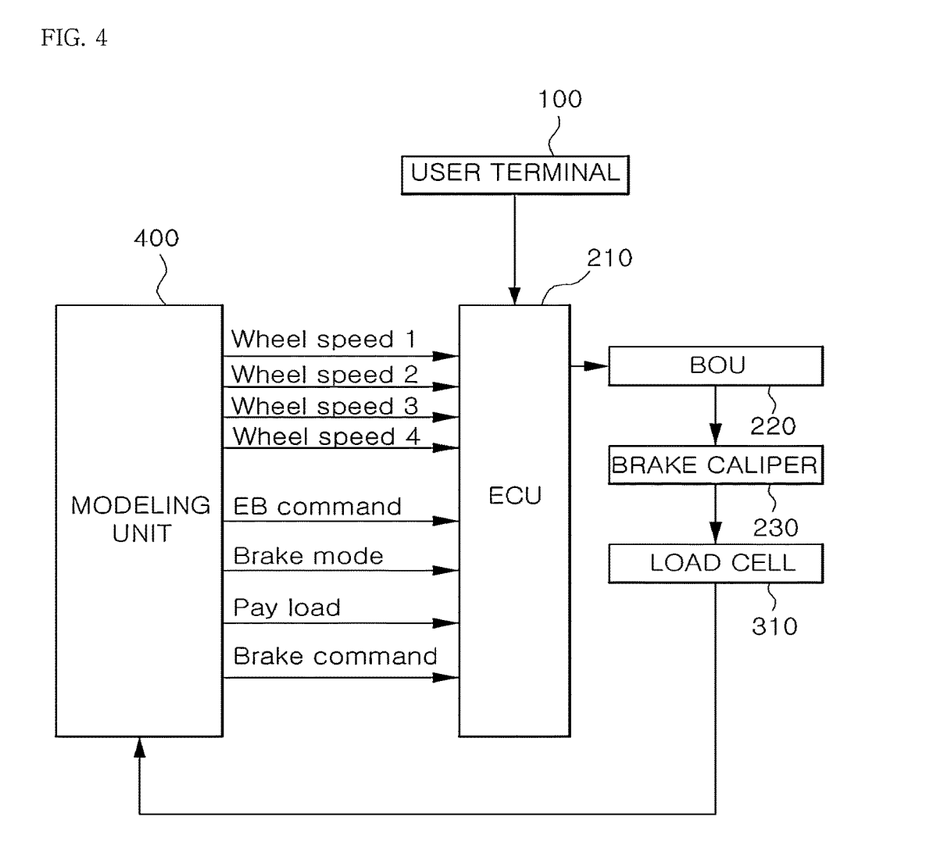
FIG. 4 is a diagram illustrating a method of operating a brake HILS system for a railway vehicle according to an embodiment of the present invention.
Figure 5:
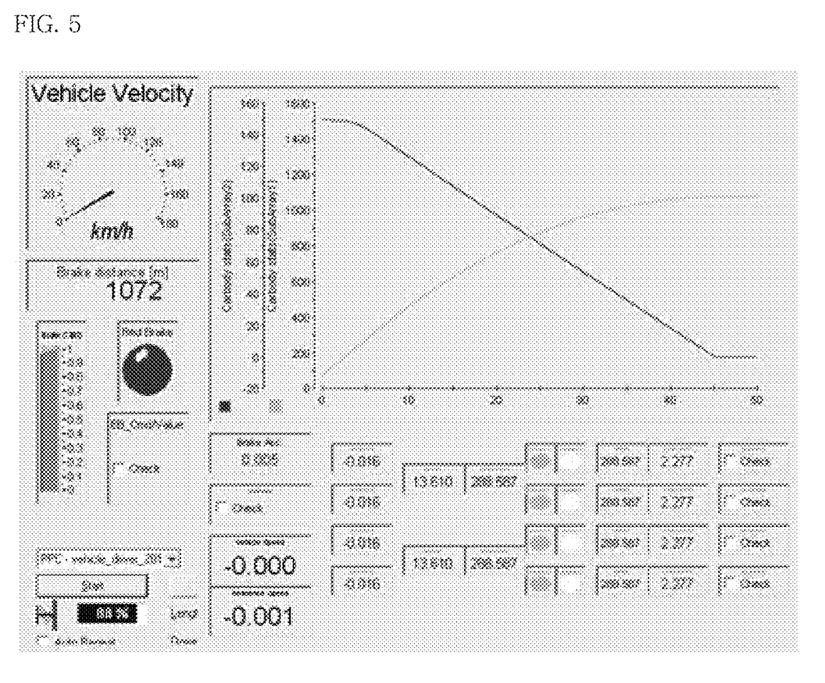
FIG. 5 is an exemplary diagram exhibiting an image of a GUI (graphics user interface) of a user terminal.
Figure 6:
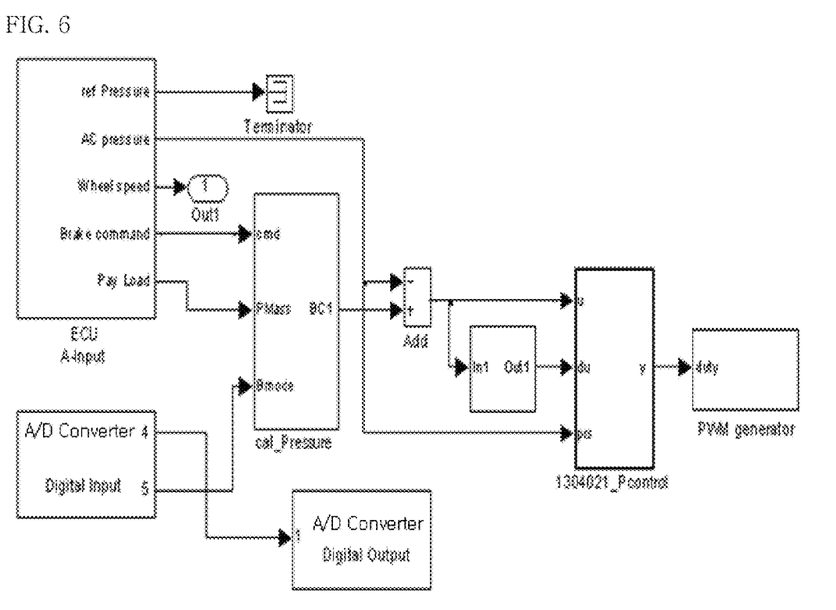
FIG. 6 is a diagram illustrating a control logic of an ECU (electronic control unit).

A method of operating the brake HILS system for a railway vehicle according to an embodiment of the present invention is described hereafter with reference to FIGS. 4 to 6.

FIG. 4 is a diagram illustrating a method of operating the brake HILS system for a railway vehicle according to an embodiment of the present invention, and FIG. 5 is an exemplary diagram showing an image of a GUI of a user terminal.

A user terminal 100 functioning as a host PC transmits command signals for brake calculation to the ECU 210 through a hardwire using a communication protocol such as Ethernet.

That is, a user can input parameters relating to braking operation such as braking command (normal braking, emergency braking, supplementary braking, stop braking, parking braking, and the like), an emergency instruction, and payload through a GUI screen of the user terminal 100, as illustrated in FIG. 5, and moreover can change the parameter values even during simulation.

The ECU 210 calculates how much braking force is needed on the basis of the command signal from the user terminal 100.

FIG. 6 is a diagram illustrating a control logic of an ECU.

As in FIG. 6, the ECU 210 includes a braking force calculation algorism according to a brake command, a vehicle interface through a hardwire, feedback of pressure measurement using an A/D converter, and pneumatic pressure control of EP valve using PWM (pulse width modulation). Accordingly, the ECU 210 calculates how much braking force is needed, by applying input braking condition values to the braking force calculation algorism.

The user terminal 100 compiles and downloads the control logic of the ECU 210, and monitors the ECU 210, tunes variables, and keeps log data when the ECU 210 is operated.

As described above, after the ECU 210 performs calculation on the basis of the input signals, it transmits the calculation result of the braking force to the BOU 220 through a signal conditioner (not illustrated). The BOU 220 produces pneumatic pressure corresponding to the calculation result and transmits it to the brake calipers 230 connected to the four wheelsets 260a, 260b, 260c, and 260d, respectively, and the brake calipers 230 apply the pneumatic pressure as a braking force to wheelsets. Further, the braking force measured by the load cells is transmitted back as simulation input of the modeling unit 400.

The modeling unit 400 performs vehicle dynamics simulation using mathematical models and performs simulation on braking of a vehicle using a brake system model.

That is, the modeling unit 400 simulates dynamic characteristics in real-time for a running or braking train, using a mathematical model and an electric braking logic in corporation with the actual pneumatic brake 200.

The vehicle dynamics simulation, which is to simulate a motion of a vehicle running on a track using a computer, solves numerically equations of motion for translation and rotation of rigid bodies in six degrees of freedom or in necessary degrees of freedom, using a vehicle model in which a car body, bogies, and wheelsets are considered as rigid bodies and are connected by springs and/or dampers. According to this method, a contact characteristic between a wheel and a rail, a creep force characteristic, and non-linearity of each component can be considered, and thus a precise dynamic model close to an actual vehicle can be constructed. Since the parameter values can be easily changed in the vehicle motion simulation, the simulation is used for investigating a ride comfort and running safety of a vehicle and can be easily achieved by those skilled in the art, so the detailed description is not provided.

The brake system model is obtained by modeling dynamic characteristics in mathematical expression when a driver gives a braking command, and it can also be easily achieved by those skilled in the art, so the detailed description is not provided.

In particular, the modeling unit 400 can simulate WSP operation in real-time by producing different adhesive forces for four wheelsets by changing a friction coefficient between a wheel and a rail in a program.

The modeling unit 400 transmits calculation results for braking of a vehicle to the user terminal 100 for monitor display, and feeds back four speed signals, Wheel speed 1, Wheel speed 2, Wheel speed 3, and Wheel speed 4 of four wheelsets, an emergency braking command, a brake mode signal, payload, and a brake command of a railway vehicle to the ECU 210. Then, the ECU 210 calculates again the braking force on the basis of the feedback information and transmits it to the BOU 220, and the BOU 220 produces pneumatic pressure corresponding to the calculation result.

Accordingly, braking dynamic characteristic corresponding to the braking force of the railway vehicle is simulated according to the command and parameters inputted through the user terminal 100.

The modeling unit 400 outputs the braking distance, the vehicle speed, the vehicle deceleration/acceleration, the rotational speeds of the wheelsets, and the braking force as simulation results, to the user terminal 100, and the GUI of the user terminal 100 displays them for user interpretation.

The user can simulate in real-time the braking dynamic characteristics of various railway vehicles by changing the parameters of various railway vehicles in the modeling unit 400.

According to an embodiment of the present invention, by simulating a portion corresponding to a dynamic characteristic model of a vehicle in real-time, by implementing a pneumatic brake system including an ECU using actual hardwares, and by interfacing all of parts relating to braking, the brake HILS system for a railway vehicle according to the present invention can provide a similar test environment for braking performance evaluation to a test environment using an actual railway vehicle.

Although embodiments of the present invention were described in detail above, the scope of the present invention is not limited to the embodiments, and various changes and modifications from the spirit of the present invention defined in the following claims by those skilled in the art are also included in the scope of the present invention.

What is claimed is:

1. A brake HILS system for a railway vehicle, comprising:
    a user terminal that receives values relating to braking conditions of a railway vehicle through a user interface and monitors simulation results;
    a pneumatic brake that includes an electronic control unit, a brake operation unit, a wheelset, a brake caliper, and a wheel slide protection valve and produces pneumatic pressure and transmits a braking force to the wheelset in accordance with the braking conditions from the user terminal;
    a load cell that is disposed on a wheel or a disc and measures a braking force from the pneumatic pressure;
    a pressure sensor that measures pneumatic pressure and feeds back thereof; and
    a modeling unit that simulates the running and braking dynamic characteristics of a railway vehicle in real-time using mathematical models,
    wherein the modeling unit:
        simulates in real-time a wheel slide protection function by producing different adhesive forces for wheelsets by changing a friction coefficient between a wheel and a rail in the vehicle running simulation;
        feeds back to the electronic control unit at least one signal among four wheelset speeds, an emergency braking command, a brake mode signal, payload, and a brake command, corresponding to the simulation result for braking of the railway vehicle;
        includes at least one parameter among a braking command, an emergency instruction, payload, a track inclination, a track friction coefficient, an adhesive coefficient, information about variable vehicle weight; and
        simulates in real-time the braking dynamic characteristics of various railway vehicles by changing the parameters of railway vehicles.

2. The system of claim 1, wherein the electronic control unit calculates a braking force to be applied to the wheelset on the basis of an input braking condition and transmit the calculation result to the brake operation unit,
    the brake operation unit produces pneumatic pressure corresponding to the calculation result and transmits the pneumatic pressure to the brake caliper on the wheelset, and
    the brake caliper converts the pneumatic pressure to a braking force acting on the wheel.

3. The system of claim 2, wherein the braking condition inputted to the user terminal includes at least one among a normal braking command, an emergency braking command, an emergency instruction, and payload.

4. The system of claim 2, wherein the simulation result monitored through the user terminal includes at least one among a braking distance, a vehicle speed, a vehicle deceleration/acceleration, a rotational speed of the wheelset, and a braking force.

* * * * *